(12) United States Patent
Khan

(10) Patent No.: US 12,377,859 B2
(45) Date of Patent: Aug. 5, 2025

(54) SYSTEM AND METHOD FOR DRIVER AUTHENTICATION AND VIOLATION DETECTION

(71) Applicant: INFOSYS LIMITED, Bangalore (IN)

(72) Inventor: Mohammed Javeeth Khan Raseeth Khan, Tirupur (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 17/700,106

(22) Filed: Mar. 21, 2022

(65) Prior Publication Data
US 2023/0294708 A1  Sep. 21, 2023

(30) Foreign Application Priority Data
Mar. 15, 2022  (IN) .............................. 202241014083

(51) Int. Cl.
*B60W 40/09* (2012.01)
*B60R 25/10* (2013.01)
*B60W 40/08* (2012.01)

(52) U.S. Cl.
CPC ............. *B60W 40/09* (2013.01); *B60R 25/10* (2013.01); *B60R 2025/1016* (2013.01); *B60W 2040/0809* (2013.01); *B60W 2540/043* (2020.02); *B60W 2756/10* (2020.02)

(58) Field of Classification Search
CPC ......... B60W 40/09; B60W 2040/0809; B60W 2540/043; B60W 2756/10; B60W 2540/30; B60W 30/09; B60R 25/10; B60R 2025/1016; B60R 22/48; B60R 2022/4808; B60R 2022/4866
See application file for complete search history.

(56) References Cited

U.S. PATENT DOCUMENTS

| | | | | |
|---|---|---|---|---|
| 4,849,733 A | * | 7/1989 | Conigliaro | B60R 22/48 340/457.1 |
| 5,438,311 A | * | 8/1995 | Lane, Sr. | B60R 25/10 340/426.26 |
| 5,661,473 A | * | 8/1997 | Paschal | B60R 25/102 340/928 |

(Continued)

FOREIGN PATENT DOCUMENTS

KR  20200014515 A  *  2/2020

*Primary Examiner* — Ryan W Sherwin
(74) *Attorney, Agent, or Firm* — Finnegan, Henderson, Farabow, Garrett & Dunner LLP (57) ABSTRACT

The present disclosure relates to surveillance system and method for detecting violation by driver in vehicle. The surveillance system comprises capturing unit for capturing license information of driver of the vehicle, upon start of the vehicle. Further, the surveillance system comprises processor configured to receive the license information of the driver from the capturing unit. Further, the processor is configured to receive continuous data related to the vehicle from one or more sensors in the vehicle. Furthermore, the processor is configured to detect occurrence of violation, of one or more pre-defined driving guidelines, based on monitoring the data related to the vehicle and the license information. Information related to the violation and the license information of the driver is transmitted to one or more external entities for taking actions against driver of the vehicle.

10 Claims, 9 Drawing Sheets

(56) References Cited

U.S. PATENT DOCUMENTS

| | | | | |
|---|---|---|---|---|
| 8,344,864 B1* | 1/2013 | Al-Mutawa | ............ | B60W 50/14 |
| | | | | 340/435 |
| 10,293,782 B1* | 5/2019 | Schaub | ................. | B60N 2/002 |
| 2005/0027428 A1* | 2/2005 | Glora | .................... | F02D 31/006 |
| | | | | 180/170 |
| 2008/0221750 A1* | 9/2008 | Baraty | .................... | G07C 5/008 |
| | | | | 701/31.4 |
| 2008/0255722 A1* | 10/2008 | McClellan | ............ | B60R 25/102 |
| | | | | 340/439 |
| 2009/0299577 A1* | 12/2009 | Demant | ............ | B60R 21/01546 |
| | | | | 701/45 |
| 2011/0087401 A1* | 4/2011 | Tsao | ........................ | B60Q 1/50 |
| | | | | 340/439 |
| 2012/0143449 A1* | 6/2012 | Chauncey | ............ | B60W 40/09 |
| | | | | 701/51 |
| 2012/0218093 A1* | 8/2012 | Yoshizawa | .......... | B60R 21/0134 |
| | | | | 340/435 |
| 2013/0144459 A1* | 6/2013 | Ricci | ................ | G08G 1/096725 |
| | | | | 701/1 |
| 2015/0106289 A1* | 4/2015 | Basir | .................... | G06Q 50/265 |
| | | | | 705/325 |
| 2017/0032673 A1* | 2/2017 | Scofield | ............ | B60R 16/0236 |
| 2017/0061812 A1* | 3/2017 | Lahav | .................... | G06Q 40/08 |
| 2017/0144628 A1* | 5/2017 | Liu | ........................... | B60T 7/18 |
| 2017/0330455 A1* | 11/2017 | Kikuchi | .................... | G06T 7/60 |
| 2020/0164882 A1* | 5/2020 | Beiderbeck | ..... | B60W 30/18163 |
| 2021/0039639 A1* | 2/2021 | Song | .................... | G06V 20/584 |
| 2021/0284176 A1* | 9/2021 | Wiesenberg | .......... | B60W 40/09 |
| 2023/0182747 A1* | 6/2023 | Kobayashi | ............. | G16Y 40/10 |
| | | | | 701/1 |
| 2023/0227037 A1* | 7/2023 | Zhao | .................... | B60W 40/105 |
| | | | | 701/1 |

* cited by examiner

SYSTEM AND METHOD FOR DRIVER AUTHENTICATION AND VIOLATION DETECTION

This application claims the benefit of Indian Patent Application Serial No. 202241014083, filed Mar. 15, 2022, which is hereby incorporated by reference in its entirety.

TECHNICAL FIELD

The present disclosure generally relates to automobile industry. More particularly, the present disclosure relates to a system and method for driver authentication and violation detection.

BACKGROUND

The number of vehicles on road are increasing at a large rate. The increasing number of vehicles are causing high volume of traffic, thereby causing an increase in number of traffic violations. Such violations inevitably lead to accidents endangering lives of people. To solve the above problem, systems that perform violation detection are needed.

Conventional systems used for the violation detection utilize data of a vehicle to detect the violation. An On-Board Diagnostics (OBD) system associated with the vehicle collects the data of the vehicle including geolocation, speed, driving behavior, and the like. The data is used to detect the violation. However, the collected data is limited to the vehicle only. For example, a rented vehicle may be driven by various drivers. But in case of any violation, a violation ticket may be raised to owner of the rented vehicle rather than the driver. In another example, a vehicle in a family may be driven by various members of the family such as, father, son, mother, friends, and the like. But in case of violation, a violation ticket may be raised to the owner of the vehicle (for instance, the father). Hence, in the conventional systems, the data is collected irrespective of the drivers driving the vehicle in order to provide violation detection. For example, driver A may drive the vehicle in a time period A and violate driving guidelines. Driver B may drive the vehicle in a time period B and may not violate the driving guidelines. The existing system only captures the data of the vehicle driven at certain time periods to detect the violation and does not consider the violation performed by a driver.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a surveillance system for detecting violation by a driver in a vehicle. The surveillance system comprises a capturing unit configured in a vehicle, and a processor. The capturing unit captures license information of a driver of the vehicle, upon start of the vehicle. The processor is configured to receive the license information of the driver from the capturing unit. Further, the processor is configured to receive continuous data related to the vehicle from one or more sensors in the vehicle, when ignition switch of the vehicle is in an ON state. Furthermore, the processor is configured to detect occurrence of violation performed by the driver, of one or more pre-defined driving guidelines. The processor performs the detection based on monitoring the data related to the vehicle and the license information. Information related to the violation and the license information of the driver is transmitted to one or more external entities for taking actions against the driver of the vehicle.

In an embodiment, the present disclosure discloses a method of detecting violation by a driver in a vehicle. The method comprises capturing license information of a driver of the vehicle, upon start of the vehicle. Further, the method comprises receiving the license information of the driver from the capturing unit. Furthermore, the method comprises receiving continuous data related to the vehicle from one or more sensors in the vehicle, when ignition switch of the vehicle is in an ON state. Thereafter, the method comprises detecting occurrence of violation performed by the driver, of one or more pre-defined driving guidelines. The detection is based on monitoring the data related to the vehicle and the license information. Information related to the violation and the license information of the driver is transmitted to one or more external entities for taking actions against the driver of the vehicle.

In an embodiment, the present disclosure discloses a non-transitory computer readable medium including instructions stored thereon that when processed by at least one processor cause a surveillance system for detecting violation by a driver in a vehicle. The surveillance system comprises a capturing unit, a processor, and a memory. The capturing unit captures license information of a driver of the vehicle, upon start of the vehicle. The processor is configured to receive the license information of the driver from the capturing unit. Further, the processor is configured to receive continuous data related to the vehicle from one or more sensors in the vehicle, when ignition switch of the vehicle is in an ON state. Furthermore, the processor is configured to detect occurrence of violation performed by the driver, of one or more pre-defined driving guidelines. The processor performs the detection based on monitoring the data related to the vehicle and the license information. Information related to the violation and the license information of the driver is transmitted to one or more external entities for taking actions against the driver of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Generally, violation detection systems use data of a vehicle such as, geolocation, speed, driving behavior, and the like, to detect the violation in the vehicle. However, data related to a driver of the vehicle is crucial for detecting violations performed by a particular driver. Accordingly, the present disclosure provides a system and a method for detecting violation performed by a driver in the vehicle. The system of the present disclosure captures license information of the driver, upon start of the vehicle. Further, the violation performed by the driver is detected using data related to the vehicle and the license information of the driver. Information related to the violation is transmitted along with the license information of the driver to external entities that may monitor the violation, such as government subscribers. Hence, the present disclosure allows to bind the license information of the driver to the information related to the violation such that data specific to the driver can be collected in case of any violation, and actions can be taken against the driver of the vehicle. As a result, the external entities can directly charge the driver of the vehicle rather than an owner of the vehicle.

Figure 1A:
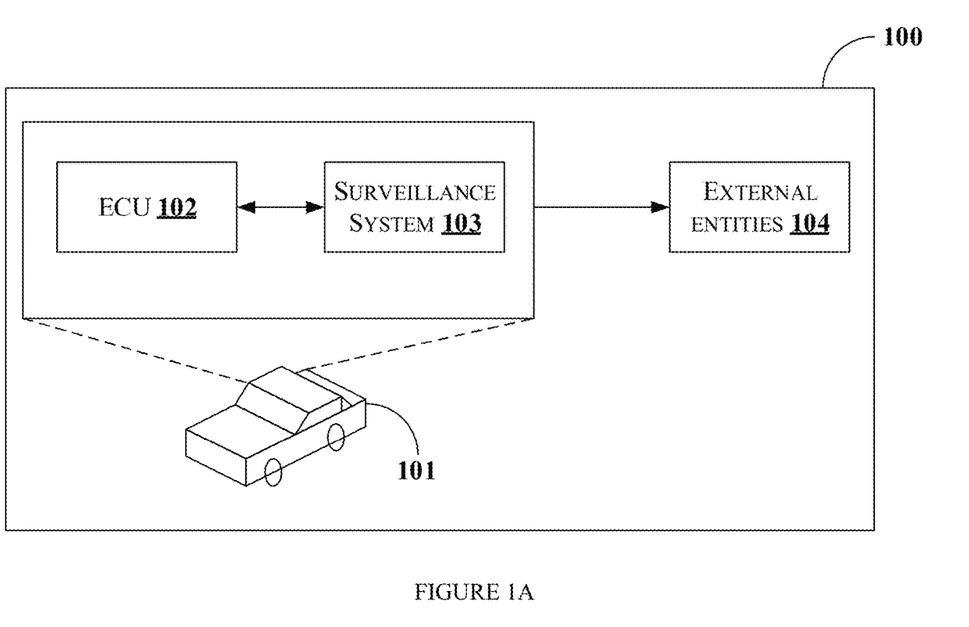
FIG. 1A illustrates an exemplary environment for detecting violation by a driver in a vehicle, in accordance with some embodiments of the present disclosure.

FIG. 1A illustrates an exemplary environment 100 for detecting violation by a driver in a vehicle, in accordance with some embodiments of the present disclosure. The exemplary environment 100 comprises a vehicle 101 and one or more external entities 104. The vehicle 101 may be a car, a truck, a motorcycle, and the like. The vehicle 101 comprises an Electronic Control Unit (ECU) 102 and a surveillance system 103. A person skilled in the art will appreciate that the vehicle 101 comprises several other components which are not shown herein explicitly as they do not fall under the scope of the present disclosure. The ECU 102 controls sensors and actuators of the vehicle 101. The surveillance system 103 may be connected to the ECU 102.

The surveillance system 103 may comprise sensors to continuously monitor various parameters of the vehicle 101. For example, the parameters may include, but not limited to, speed of the vehicle 101, seat belt status of a driver of the vehicle 101, driving behaviour, location of the vehicle 101, and the like. The surveillance system 103 may monitor the parameters for providing various insights to the driver such as, the speed of the vehicle 101 at different instances of time, data related to fuel consumption, and the like. In an embodiment, the surveillance system 103 may be, an intelligent speed assist system, a connect system, an On-board Diagnostics (OBD) system, and the like, associated with the vehicle 101. In an embodiment, the surveillance system 103 may be pre-installed in the vehicle 101. In another embodiment, the surveillance system 103 may be installed in the vehicle 101 using an interface. The interface may be at least one of a Universal Serial Bus (USB) port, Bluetooth, and the like. A person of ordinary skill should appreciate that other types of interfaces also come under the scope of the present disclosure and are not limited to aforementioned types of interfaces. In an embodiment, the interface used in the vehicle 101 may be a 16-pin port, although other pin configurations may be provided. In an embodiment, the interface may be provided under dashboard, for example, beneath steering wheel column of the vehicle 101. A person of ordinary skill should appreciate that interface may be provided on any suitable part of the vehicle 101 to plug the surveillance system 103. In an embodiment, the surveillance system 103 may be an adapter which can be plugged to the vehicle 101 using the interface.

Figure 1B:
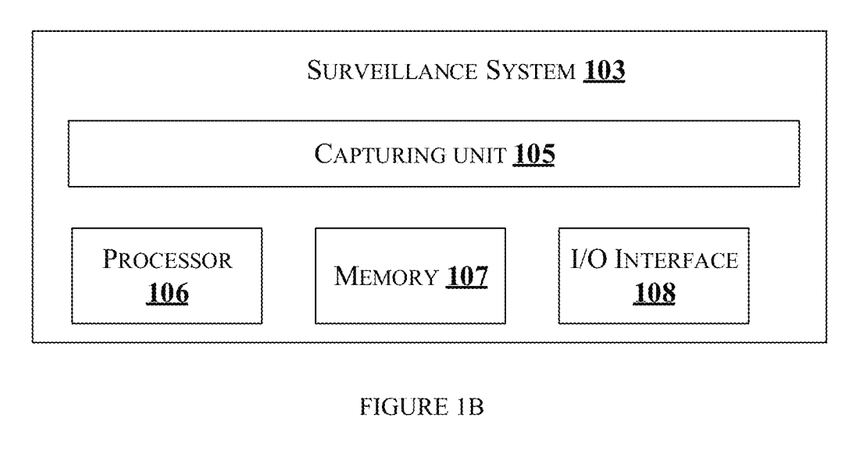
FIG. 1B illustrates a block diagram of a surveillance system for detecting violation by the driver in the vehicle, in accordance with some embodiments of the present disclosure.

FIG. 1B illustrates a block diagram of a surveillance system 103 for detecting violation by the driver in the vehicle 101, in accordance with some embodiments of the present disclosure. As shown, the surveillance system 103 comprises a capturing unit 105 configured in the vehicle 101, a processor 106, a memory 107, and an Input/Output (I/O) interface 108. A person skilled in the art will appreciate that the surveillance system 103 comprises several other components, for example, a sensor assembly comprising multiple sensors. The capturing unit 105 may capture license information of the driver of the vehicle 101, upon start of the vehicle 101. The capturing unit 105 may capture the license information using various methods described in later part of the present description. The processor 106 may receive the license information of the driver from the capturing unit 105. Also, the processor 106 may receive continuous data related to the vehicle 101 from one or more sensors in the vehicle 101. The one or more sensors may be configured in at least one of, the vehicle 101 and the sensor assembly of the surveillance system 103. The continuous data may be received when ignition switch of the vehicle 101 is in an ON state. The processor 106 detects occurrence of violation performed by the driver, of one or more pre-defined driving guidelines, based on monitoring the data related to the vehicle 101 and the license information. Then, information related to the violation and the license information of the driver is transmitted to one or more external entities 104 (as illustrated in FIG. 1A) for taking actions against the driver of the vehicle 101. For example, the one or more external entities 104 may include government subscribers, roadway maintenance crews, vehicle manufacturers, and the like.

In some embodiments, the memory 107 may be communicatively coupled to the processor 106. The memory 107 stores instructions executable by the processor 106. The processor 106 may comprise at least one data processor for executing program components for executing user or system-generated requests. The memory 107 may be communicatively coupled to the processor 106. The memory 107 stores instructions, executable by the processor 106, which, on execution, may cause the processor 106 to detect violation by the driver in the vehicle 101.

Figure 2:
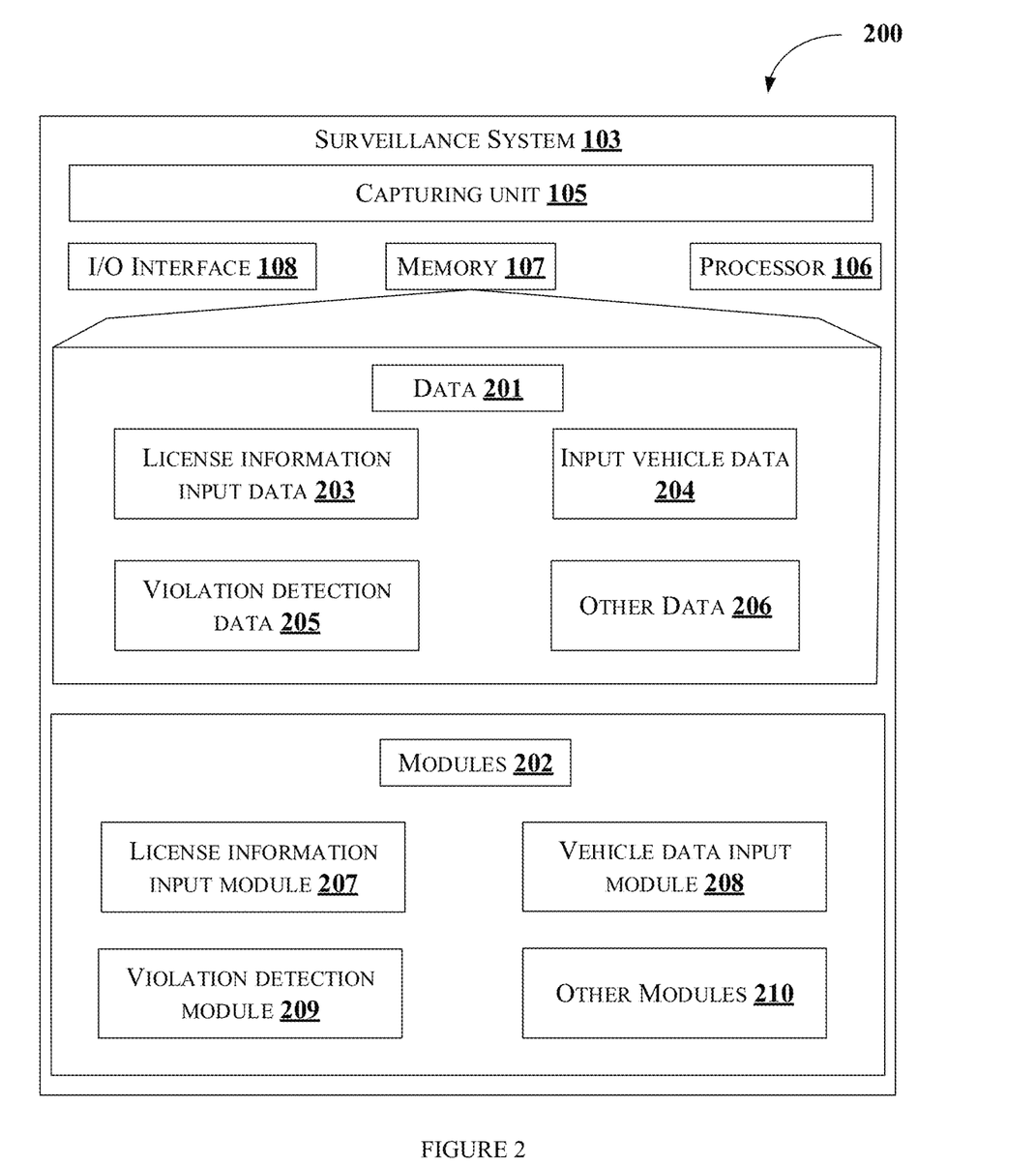
FIG. 2 illustrates a detailed diagram of the surveillance system for detecting violation by the driver in the vehicle, in accordance with some embodiments of the present disclosure.

FIG. 2 illustrates a detailed diagram 200 of the surveillance system 103 for detecting violation by the driver in the vehicle 101, in accordance with some embodiments of the present disclosure. The surveillance system 103 may comprise the capturing unit 105, the processor 106, the memory 107, and the I/O interface 108.

The capturing unit 105 may be configured in the vehicle 101. The capturing unit 105 may be configured to capture the license information of the driver of the vehicle 101. The license information of the driver may be captured upon start of the vehicle 101 so that the violation by the driver may be detected by the surveillance system 103. In an example, the driver may start the vehicle 101 at a first time instance. The capturing unit 105 may capture the license information at the first time instance. Consider that the driver stops the vehicle 101 to fuel the vehicle 101 at a second time instance. The driver may start the vehicle 101 again at a third time instance. In such case, the capturing unit 105 may again capture the license information at the third time instance. The license information may comprise at least one of, a license number, identification details of the driver, date of issue of a license, validity of the license, identification details of the vehicle 101, and the like.

Figure 3A:
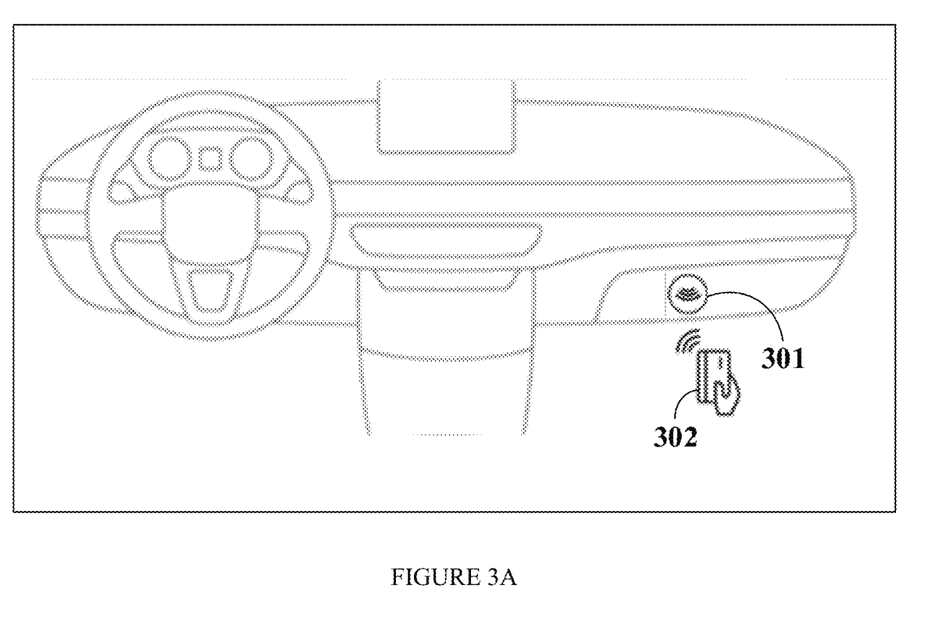
FIGS. 3A-3D show exemplary embodiments of capturing license information in a driver, in accordance with some embodiments of the present disclosure.
Figure 3B:
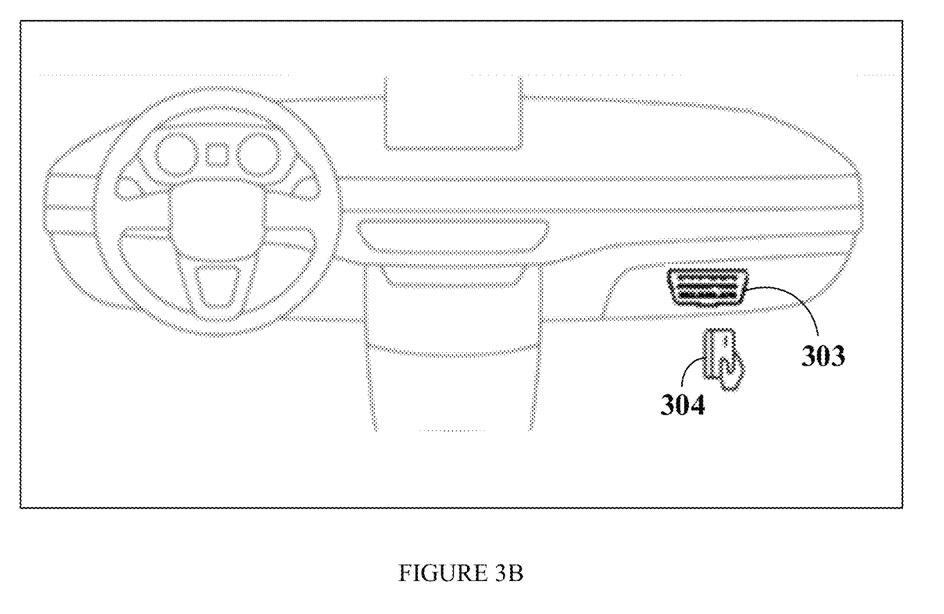

The capturing unit 105 comprises at least one of the following. In an embodiment, the capturing unit 105 may comprise a wireless communication device for capturing the license information from a license of the driver. The license may be enabled with the wireless communication to communicate with the wireless communication device. Reference is now made to FIG. 3A illustrating a wireless communication device 301. The wireless communication device 301 may be a Near-Field Communication (NFC) reader. The driver may communicate the license information to the capturing unit 105 via NFC communication. The license of the driver is illustrated as 302. The license 302 may be enabled with NFC tag to communicate with the NFC reader. The driver may hold the license 302 near to the NFC reader to transmit the license information. A person skilled in the art will appreciate that the license information may be communicated using other wireless communication methods such as Radio Frequency Identification (RFID) and is not limited to above-mentioned methods. The configuration of the wireless communication device in the surveillance system 103 is not illustrated in Figures and this should not be considered as limiting. In an embodiment, the surveillance system 103 may be placed in a slot inside the vehicle 101 on dashboard of the vehicle 101. A person skilled in the art will appreciate that the surveillance system 103 may be placed in any other parts of the vehicle 101. The capturing unit 105 may be placed on outer part of the surveillance system 103 such that the capturing unit 105 is accessible to the driver. In another embodiment, the capturing unit 105 may comprise a connector for capturing the license information from the license. The license may be a chip-based license that is configured to plug to the connector to transmit the license information. Reference is now made to FIG. 3B illustrating a connector 303 for plugging a chip-based license 304. The connector 303 may include a slot to insert the chip-based license. The connector configured in the surveillance system 103 is not illustrated in Figures and this should not be considered as limiting.

Figure 3C:
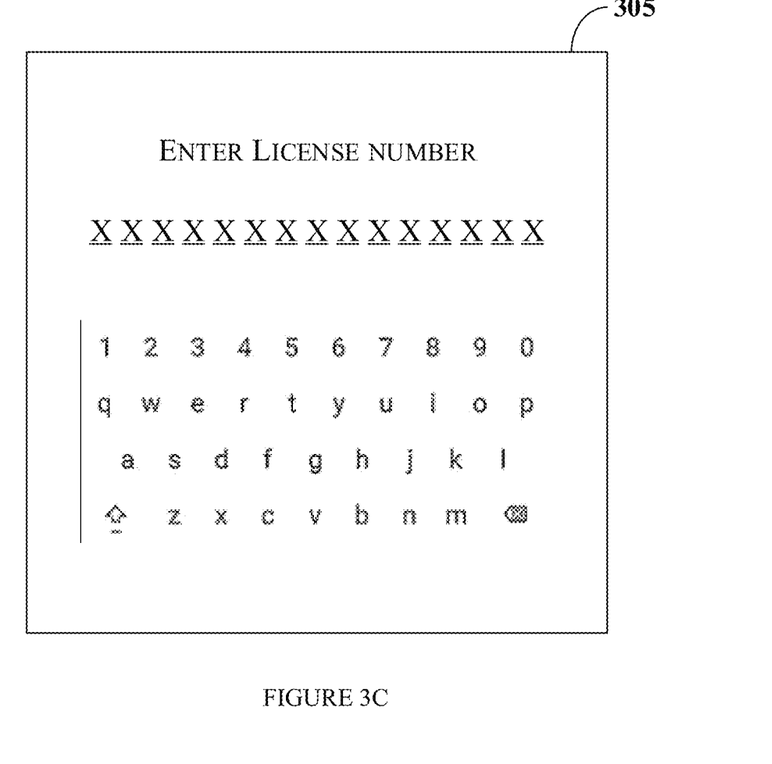

In an embodiment, the capturing unit 105 may comprise a user interface configured to receive the license information from the driver of the vehicle 101. The driver may manually enter the license information via the user interface. A person skilled in the art will appreciate that other methods to enter the license information via the user interface may also be used such as, voice-based methods, and the like. In an example, the user interface may display an error when the license information entered by the driver is not in correct format. Reference is now made to FIG. 3C illustrating a user interface 305. In an example, the user interface 305 may display a command "Enter license number". The driver may enter the license number. In an embodiment, the user interface 305 may be associated with a database. The database may include the license information of drivers associated with the vehicle 101. The user interface 305 may receive the license number of the driver. In an embodiment, other license information of the driver such as, the identification details of the driver, date of issue of the license, validity of the license, identification details of the vehicle 101, and the like may be received from the database.

Figure 3D:
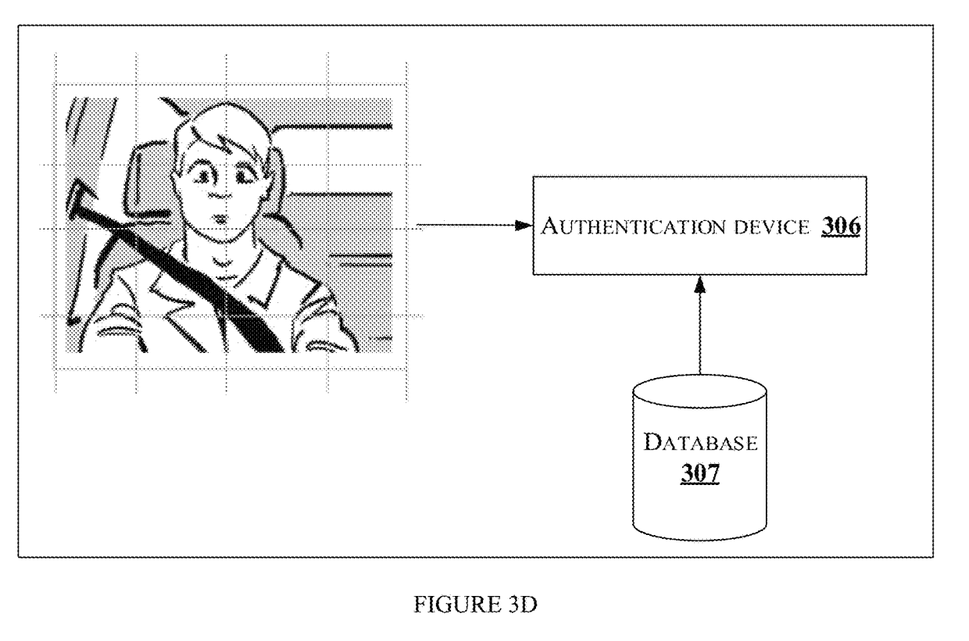

In an embodiment, the capturing unit 105 may be configured as an authentication device to authenticate the driver based on biometric identification information of the driver. The authentication device may compare the biometric identification device with pre-stored biometric identification information of the driver to authenticate the driver. Further, the authentication device may be configured to obtain the license information pre-stored in the vehicle 101, upon successful authentication. In another embodiment, the vehicle 101 may comprise a preconfigured biometric authentication device. The authentication device may be connected to the preconfigured biometric authentication device of the vehicle 101. The preconfigured biometric authentication device may authenticate the driver based on the biometric identification information of the driver, and provide data related to the authentication to the authentication device to obtain the license information. In an example, profiles of multiples users of the vehicle 101 may be pre-stored in the vehicle 101. Each profile may include the corresponding biometric identification information, vehicle setting information along with the license information of respective user mapped to the corresponding biometric identification information. The biometric identification information of the driver may comprise one of, facial information, voice information, fingerprint information, and the like. The authentication device may receive the biometric identification information of the driver. Then, the authentication device may authenticate the driver based on biometric identification information and obtain the license information from the corresponding profile. Reference is now made to FIG. 3D illustrating an authentication device 306. The authentication device 306 may receive facial information of the driver to authenticate the driver. Further, the authentication device 306 may obtain the license information of the driver from the database (referred as 307 in FIG. 3D), upon successful authentication of the driver. In an embodiment, the license information may be validated by transmitting the license information to the one or more external entities 104 such as government subscribers.

Referring back to FIG. 2, in an embodiment, the memory 107 may include one or more modules 202 and data 201. The one or more modules 202 may be configured to perform the steps of the present disclosure using the data 201, to detect the violation by the driver in the vehicle 101. In an embodiment, each of the one or more modules 202 may be a hardware unit which may be outside the memory 107 and coupled with the surveillance system 103. As used herein, the term modules 202 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 202 when configured with the described functionality defined in the present disclosure will result in a novel hardware. Further, the I/O interface 108 is coupled with the processor 106 through which an input signal or/and an output signal is communicated. For example, the surveillance system 103 may communicate with the ECU 102 via the I/O interface 108.

In one implementation, the modules 202 may include, for example, a license information input module 207, a vehicle data input module 208, a violation detection module 209, and other modules 210. It will be appreciated that such aforementioned modules 202 may be represented as a single module or a combination of different modules. In one implementation, the data 201 may include, for example, license information input data 203, input vehicle data 204, violation detection data 205, and other data 206.

In an embodiment, the license information input module 207 may be configured to receive the license information of the driver from the capturing unit 105. The license information may comprise at least one of, the license number, the identification details of the driver, the date of issue of the license, the validity of the license, the identification details of the vehicle 101, and the like. In an embodiment, the license information input module 207 may receive the license number of the driver from the capturing unit 105. The license information input module 207 may obtain other license information from the database associated with the license information input module 207 by mapping the received license number and the license number in the database. In another embodiment, the license information may be directly received from the capturing unit 105. The license information of the driver may be stored as the license information input data 203 in the memory 107.

In an embodiment, the vehicle data input module 208 may be configured to receive continuous data related to the vehicle 101 from one or more sensors in the vehicle 101. The data related to the vehicle 101 may comprise at least one of, the speed of the vehicle 101, seat belt status of the driver, the driving behaviour, the location of the vehicle 101, and the like. In an embodiment, the one or more sensors may be configured in at least one of, the vehicle 101 and the surveillance system 103 of the vehicle 101. For example, the surveillance system 103 may comprise a speed sensor, a geo-location sensor, and the like. In an embodiment, the vehicle 101 may comprise a magnetically operated sensor to monitor the seat belt status, acceleration sensor, fuel consumption sensor, direction sensor, and the like. The vehicle data input module 208 may receive the continuous data when the ignition switch of the vehicle 101 is in the ON state. The data related to the vehicle 101 may be stored as the input vehicle data 204 in the memory 107.

In an embodiment, the violation detection module 209 may be configured to receive the license information input data 203 from the license information input module 207 and the input vehicle data 204 from the vehicle data input module 208. Further, the violation detection module 209 may be configured to detect occurrence of violation performed by the driver. The violation detection module 209 may detect occurrence of violation of the one or more pre-defined driving guidelines, based on monitoring the data related to the vehicle 101 and the license information. The one or more pre-defined guidelines comprise rules and regulations to ensure that the drivers drive safely and responsibly. The one or more pre-defined guidelines may be specific to a country or various locations in a country. In an example, the one or more pre-configured guidelines comprises following:

Driver with age limit of 20-23 can drive only at maximum of 60 kmph irrespective to the defined road speed limit.

Leaning drivers are allowed to drive only at maximum speed of 60 kmph irrespective to the defined road speed limit.

New drivers up to 12 months from date of issue of the license can drive only at maximum speed of 80 kmph irrespective to the defined road speed limit.

Drivers are not allowed to drive vehicle without wearing seatbelt for prolonged span of 5 minutes.

Drivers are only allowed to drive properly maintained drivable fit vehicles.

Drivers are not allowed to drive vehicle above defined road speed limit for more than 30 secs.

Driving vehicle without vehicle insurance will be subjected to violation charges.

The violation detection module 209 may be configured to obtain driver data from the license information of the driver. The driver data may comprise demographic information of the driver, the license number, and the like. The violation detection module 209 may compare the driver data and the data related to the vehicle 101 with the one or more pre-defined driving guidelines. For example, consider that the violation detection module 209 identifies that the age of the driver is "22" from the driver data and the speed of the vehicle 101 is 80 kmph from the data related to the vehicle 101. In this example, the one or more pre-defined guidelines refer to guidelines stated in above example. In such case, the violation detection module 209 may detect occurrence of a violation, since the speed of the vehicle 101 is greater than speed defined in the one or more pre-defined driving guidelines i.e., 60 kmph. In another example, the violation detection module 209 may detect that the speed of the vehicle 101 is greater than a defined speed in a location based on the location data obtained from the data related to the vehicle 101. The defined speed may be road speed limit defined for the location. In another example, the violation detection module 209 may determine driver behavior of the driver based on the data related to the vehicle 101 such as speed, acceleration, fuel consumption, and the like. The violation detection module 209 may assign a driving score to the driver. The driving score may be increased each time the violation is detected. In another example, the violation detection module 209 may determine that the driver of the vehicle 101 is not wearing seat belt for more than five minutes based on the data related to the vehicle 101. The violation detection module 209 may detect occurrence of the violation of the one or more pre-defined guidelines based on the comparison. In another example, the occurrence of the violation may be detected by capturing data related to fitness of the vehicle such as, smoke emission data, regular service data, and the like. Information related to the violation by the driver may be stored as the violation detection data 205 in the memory 107. Further, the violation detection module 209 may be configured to transmit the information related to the violation and the license information of the driver to the one or more external entities 104 for taking actions against the driver of the vehicle 101. In an embodiment, the information related to the violation may be transmitted to a central facility (for example, a cloud server) via a Vehicle To Everything (V2X) unit associated with the vehicle 101. The information may be transmitted from the central facility to the one or more external entities 104. A person skilled in the art will appreciate that the information related to the violation may be transmitted to the one or more external entities 104 using methods other than the above-mentioned method. The one or more external entities 104 may include, but not limited to, roadway maintenance crews, vehicle manufacturers, governmental agencies such as, transportation authorities, law enforcement, legislative bodies, and the like, insurance company, and the like. In an embodiment, a violation ticket may be raised for performing the violation. In an embodiment, the driver may justify the violation ticket from a driver login portal provided by a vehicle department.

The other data 206 may store data, including temporary data and temporary files, generated by the one or more modules 202 for performing the various functions of the surveillance system 103. The one or more modules 202 may also include the other modules 210 to perform various miscellaneous functionalities of the surveillance system 103. For example, the other modules 210 may include a communication module. The communication module may be configured to transmit a request to the ECU 102 of the vehicle 101, to control the vehicle 101 based on the one or more pre-defined driving guidelines, upon detecting the occurrence of the violation. For example, the violation detection module 209 may detect that the speed is 80 kmph and is greater than the speed defined in the one or more pre-defined driving guidelines, In such case, the communication module may communicate the request to the ECU 102 to control the speed of the vehicle 101 within 60 kmph. The other data 206 may be stored in the memory 107. It will be appreciated that the one or more modules 202 may be represented as a single module or a combination of different modules.

Figure 4:
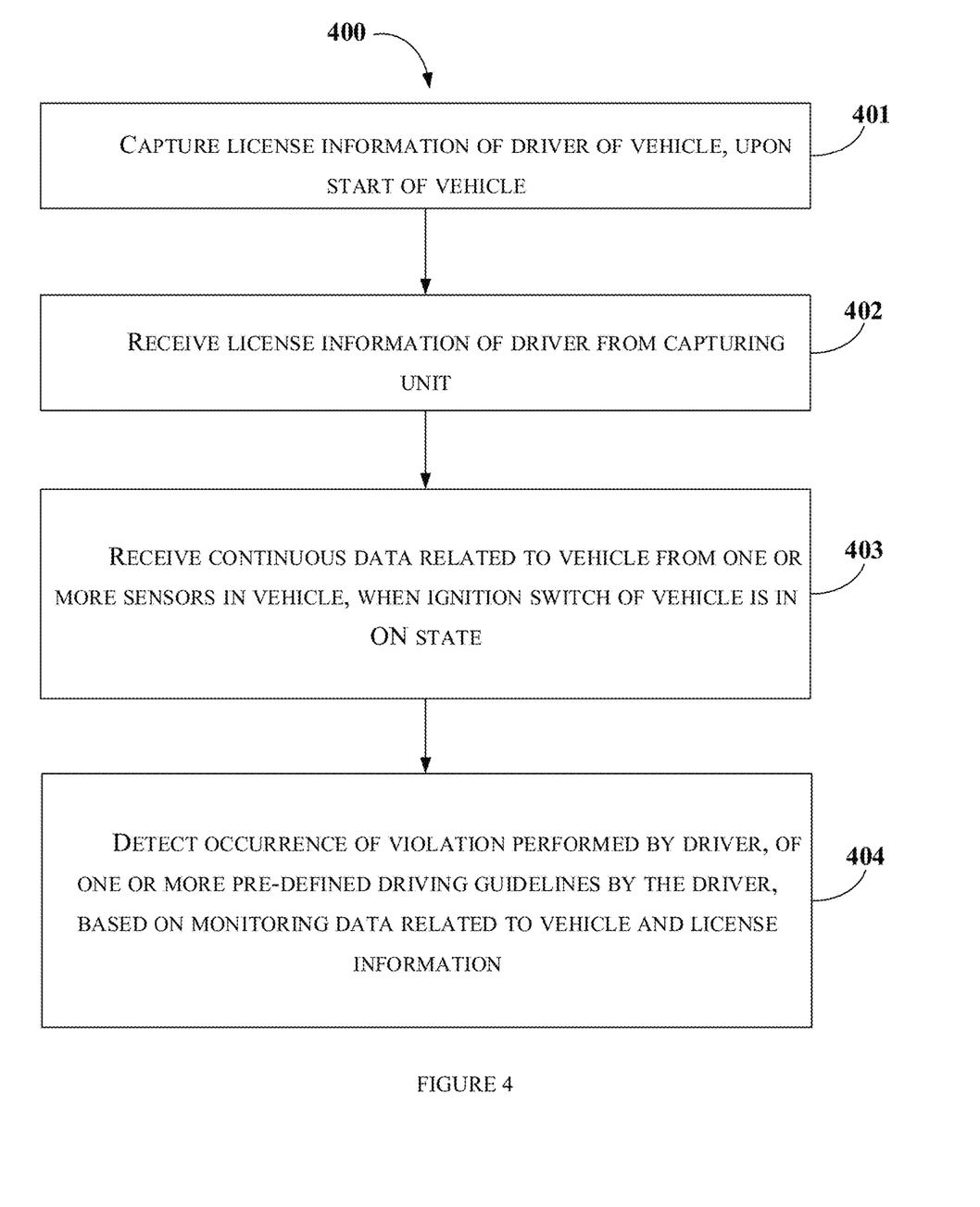
FIG. 4 shows an exemplary flow chart illustrating method steps for detecting violation by the driver in the vehicle, in accordance with some embodiments of the present disclosure.

FIG. 4 shows an exemplary flow chart illustrating method steps for detecting violation by the driver in the vehicle 101, in accordance with some embodiments of the present disclosure. As illustrated in FIG. 4, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the capturing unit 105 of the surveillance system 103 captures the license information of a driver of the vehicle 101, upon start of the vehicle 101. In an embodiment, the capturing unit 105 may comprise the wireless communication device for capturing the license information from a license of the driver. In another embodiment, the capturing unit 105 may comprise a connector for capturing the license information from the license. In another embodiment, the capturing unit 105 may comprise a user interface configured to receive the license information from the driver of the vehicle 101. In an embodiment, the capturing unit 105 may be configured as an authentication device configured to authenticate the driver based on biometric identification information of the driver. Further, the authentication device may be configured to obtain the license information pre-stored in the vehicle 101, upon successful authentication. In another embodiment, the capturing unit 105 may be connected to a preconfigured biometric authentication device. The preconfigured biometric authentication device may authenticate the driver based on the biometric identification information of the driver, and provide data related to the authentication to the authentication device to obtain the license information.

At step 402, the processor 106 of the surveillance system 103 receives the license information of the driver from the capturing unit 105. The license information may comprise at least one of, license number, identification details of the driver, date of issue of a license, validity of the license, identification details of the vehicle 101, and the like.

At step 403, the processor 106 of the surveillance system 103 receives continuous data related to the vehicle 101 from the one or more sensors in the vehicle 101. The data related to the vehicle 101 may comprise at least one of, speed of the vehicle 101, seat belt status of the driver, driving behaviour, location of the vehicle 101, and the like. In an embodiment, the one or more sensors may be configured in at least one of, the vehicle 101 and the surveillance system 103 of the vehicle 101.

At step 404, the processor 106 of the surveillance system 103 detects occurrence of violation performed by the driver, of one or more pre-defined driving guidelines, based on monitoring the data related to the vehicle 101 and the license information. The processor 106 may be configured to obtain the driver data from the license information of the driver. The processor 106 may compare the driver data and the data related the vehicle 101 with the one or more pre-defined driving guidelines. The one or more pre-defined guidelines may comprise rules and regulations to be followed by the driver of the vehicle 101. The processor 106 may detect the occurrence of the violation of the one or more pre-defined driving guidelines based on the comparison.

Computer System

Figure 5:
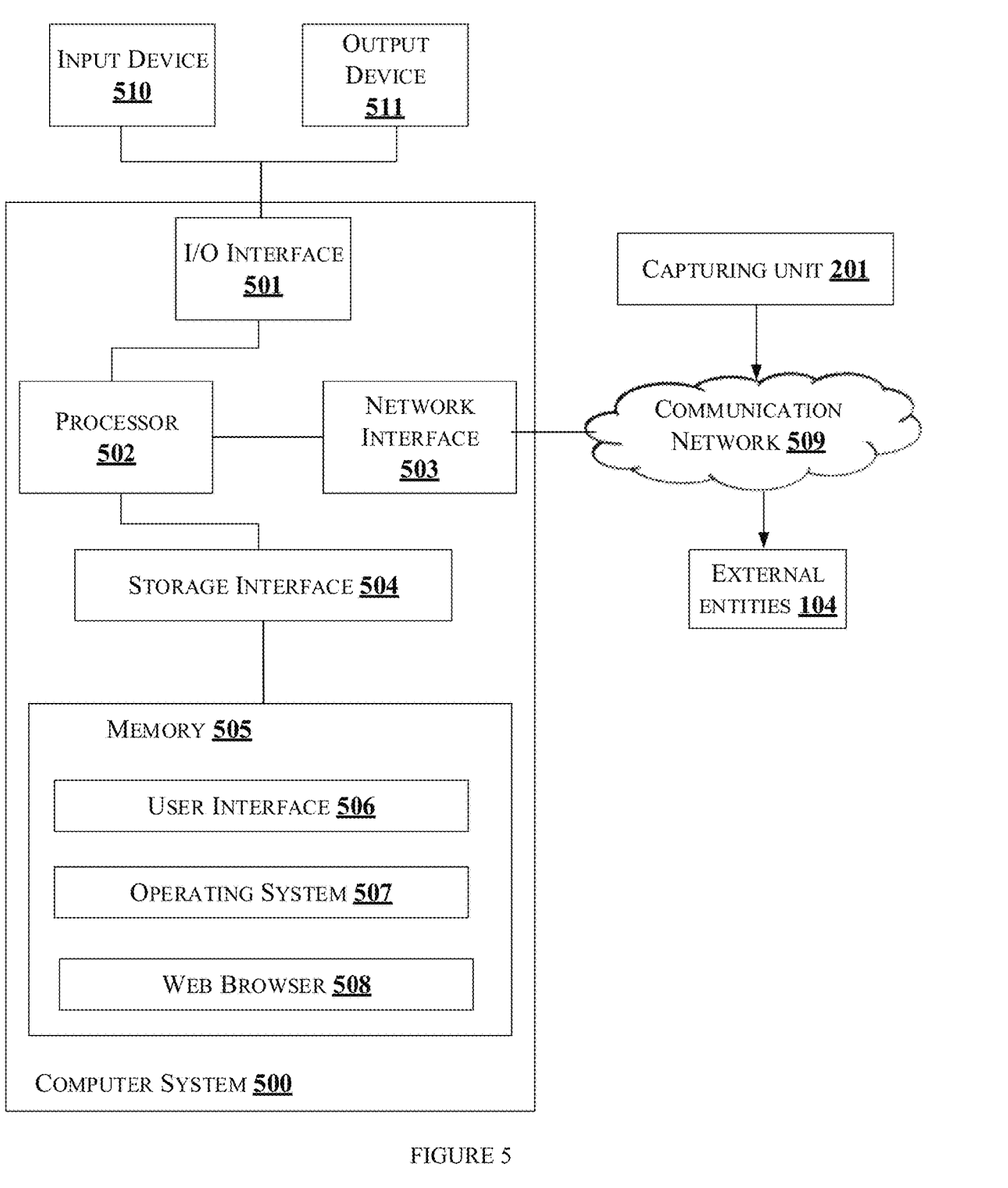
FIG. 5 illustrates a block diagram of an exemplary computer system for detecting violation by the driver in the vehicle, in accordance with some embodiments of the present disclosure.

FIG. 5 illustrates a block diagram of an exemplary computer system 500 for implementing embodiments consistent with the present disclosure. In an embodiment, the computer system 500 may be used to implement the processor 106 of the surveillance system 103. Thus, the computer system 500 may be used for detecting the violation by the driver in the vehicle 101. The license information may be received from the capturing unit 105 over the communication network 509. Further, the information related to the violation may be transmitted to the one or more external entities 104 over the communication network 509. The computer system 500 may comprise a Central Processing Unit 502 (also referred as "CPU" or "processor"). The processor 502 may comprise at least one data processor. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLER ANDROID™, BLACKBERRY® OS, or the like.

In some embodiments, the computer system 500 may implement the web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the present disclosure provides systems and methods for detecting violation by driver in a vehicle. The system of the present disclosure captures license information of the driver, upon start of the vehicle. Further, the violation is detected using the data related to the vehicle and the license information of the driver. Information related to the violation is transmitted along with the license information of the driver to external entities that monitor the violation, such as government subscribers. Hence, the present disclosure allows to bind the license information of the driver to the information related to the violation, so that data in specific to the driver can be collected in case of the violation and actions can be taken against the driver of the vehicle. The system of the present disclosure detects violation performed by the driver, of the one or more pre-defined driving guidelines that comprise speed limits to be followed by the driver. The actions are taken against the driver in case of violation of the one or more pre-defined driving guidelines. The government subscribers can directly charge the driver rather than owner of the vehicle. Hence, the present disclosure reduces road safety infrastructure cost such as speeding camera, Radio Detection and Ranging (RADAR), and the like to monitor the speed of the vehicle.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method of detecting violation by a driver in a vehicle, the method comprising:

comparing, by a capturing unit of a surveillance system, biometric identification information of the driver with a plurality of profiles associated with the vehicle, wherein each of the plurality of profiles includes biometric identification information associated with a corresponding driver;

authenticating, by the capturing unit, the driver of the vehicle based on the comparison;

obtaining, by the capturing unit, license information of the driver of the vehicle from a profile, of the plurality of profiles, associated with the driver, wherein the obtaining of the information is based on a successful authentication of the driver of the vehicle, and wherein the license information is obtained upon start of the vehicle;

receiving, by a processor of the surveillance system, the license information of the driver from the capturing unit;

receiving, by the processor, continuous data related to the vehicle from one or more sensors in the vehicle, when ignition switch of the vehicle is in an ON state, wherein the one or more sensors comprise a magnetically operated sensor to monitor a seat belt status and a fuel consumption sensor to monitor a fuel consumption of the vehicle;

detecting, by the processor, an occurrence of a violation performed by the driver, of one or more pre-defined driving guidelines, based on monitoring of the continuous data related to the vehicle and the license information;

transmitting a request to an Electronic Control Unit (ECU) of the vehicle, to control the speed of the vehicle based on the one or more pre-defined driving guidelines, based on the detection of the occurrence of the violation; and transmitting information related to the violation and the license information of the driver to one or more external entities for taking actions against the driver of the vehicle.

2. The method of claim 1, wherein the license information comprises at least one of:
a license number, identification details of the driver, a date of issue of a license, validity of the license, or identification details of the vehicle.

3. The method of claim 1, wherein the biometric identification information of the driver comprises one of:
facial information, voice information, or fingerprint information.

4. The method of claim 1, wherein the data related to the vehicle comprises at least one of:
a speed of the vehicle, a seat belt status of the driver, driving behaviour, and a location of the vehicle.

5. The method of claim 1, wherein the detection of occurrence of the violation comprises:
obtaining driver data from the license information of the driver;
comparing the driver data and the data related the vehicle with the one or more pre-defined driving guidelines; and
detecting the occurrence of the violation of the one or more pre-defined driving guidelines based on the comparison.

6. A non-transitory computer readable medium including instructions stored thereon that when processed by a processor causes a surveillance system to perform steps comprising:
comparing biometric identification information of a driver with a plurality of profiles associated with a vehicle, wherein each of the plurality of profiles includes biometric identification information associated with a corresponding driver;
authenticating the driver of the vehicle based on the comparison;
obtaining license information of a the driver of the vehicle from a profile, of the plurality of profiles, associated with the driver, wherein the obtaining of the information is based on a successful authentication of the driver of the vehicle, wherein the license information is obtained upon start of the vehicle;
receive continuous data related to the vehicle from one or more sensors in the vehicle, when ignition switch of the vehicle is in an ON state, wherein the one or more sensors comprise a magnetically operated sensor to monitor a seat belt status and a fuel consumption sensor to monitor a fuel consumption of the vehicle;
detect an occurrence of a violation performed by the driver, of one or more pre-defined driving guidelines, based on monitoring of the continuous data related to the vehicle and the license information; and
transmit information related to the violation and the license information of the driver to one or more external entities for taking actions against the driver of the vehicle.

7. The non-transitory computer readable medium of claim 6, wherein the license information comprises at least one of:
a license number, identification details of the driver, a date of issue of the license, validity of the license, or identification details of the vehicle.

8. The non-transitory computer readable medium of claim 6, wherein the data related to the vehicle comprises at least one of:
a speed of the vehicle, a seat belt status of the driver, driving behaviour, and a location of the vehicle.

9. The non-transitory computer readable medium of claim 6, wherein the processor detects the occurrence of the violation by:
obtaining driver data from the license information of the driver;
comparing the driver data and the data related to the vehicle with the one or more pre-defined driving guidelines; and
detecting the occurrence of the violation of the one or more pre-defined driving guidelines based on the comparison.

10. The non-transitory computer readable medium of claim 6, wherein the processor is further configured to transmit a request to an Electronic Control Unit (ECU) of the vehicle, to control the vehicle based on the one or more pre-defined driving guidelines, upon detecting the occurrence of the violation.

* * * * *